(12) United States Patent
Dain et al.

(10) Patent No.: US 10,599,559 B2
(45) Date of Patent: Mar. 24, 2020

(54) VALIDATING A SOFTWARE DEFINED STORAGE SOLUTION BASED ON FIELD DATA

(71) Applicant: International Business Machines Corporation, Armonk, NY (US)

(72) Inventors: Joseph W. Dain, Vail, AZ (US); Stefan Lehmann, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 15/359,322

(22) Filed: Nov. 22, 2016

(65) Prior Publication Data

US 2018/0143898 A1    May 24, 2018

(51) Int. Cl.
*G06F 11/00*    (2006.01)
*G06F 11/36*    (2006.01)
*G06F 8/60*    (2018.01)

(52) U.S. Cl.
CPC ............ *G06F 11/3692* (2013.01); *G06F 8/60* (2013.01); *G06F 11/3684* (2013.01); *G06F 11/3688* (2013.01)

(58) Field of Classification Search
CPC .... G06F 8/60; G06F 11/3684; G06F 11/3688; G06F 11/3692
See application file for complete search history.

(56) References Cited

U.S. PATENT DOCUMENTS

| | | | |
|---|---|---|---|
| 7,167,914 B2 | 1/2007 | Cohen et al. | |
| 7,904,753 B2 | 3/2011 | Athey et al. | |
| 8,683,424 B2 | 3/2014 | Colombo et al. | |
| 8,850,393 B2 | 9/2014 | Castro et al. | |
| 8,924,521 B2 | 12/2014 | Acuna et al. | |
| 8,978,015 B2 | 3/2015 | Pechanec et al. | |
| 9,037,911 B2 | 5/2015 | Rentschler et al. | |
| 9,081,747 B1* | 7/2015 | Tabieros | G06F 9/4411 |
| 9,270,754 B2 | 2/2016 | Iyengar et al. | |
| 9,552,259 B1* | 1/2017 | Chopra | G06F 11/1461 |
| 9,678,731 B2 | 6/2017 | Hassine et al. | |
| 10,135,871 B2* | 11/2018 | Luo | H04L 63/20 |
| 2005/0198631 A1 | 9/2005 | Bisher et al. | |
| 2011/0078510 A1 | 3/2011 | Beveridge et al. | |
| 2013/0138718 A1* | 5/2013 | Mallur | G06F 8/61 709/203 |
| 2014/0282031 A1* | 9/2014 | Hinterbichler | G06F 11/3656 715/738 |

(Continued)

FOREIGN PATENT DOCUMENTS

WO    2014/147607 A1    9/2014

OTHER PUBLICATIONS

Mark Peters, Monya Kean; "Key Reasons to Use Software-defined Storage—and How to Get Started"; IBM Whitepaper, IBM.com website; Feb. 2015.

(Continued)

*Primary Examiner* — Joshua P Lottich
(74) *Attorney, Agent, or Firm* — Kunzler Bean & Adamson

(57) ABSTRACT

For validating a Software Defined Storage (SDS) solution based on SDS field data, a processor analyzes the SDS field data for a given SDS solution with a log analytics function. The SDS solution has not been validated with a test suite. The processor further validates the given SDS solution based on the SDS field data.

20 Claims, 12 Drawing Sheets

(56) References Cited

U.S. PATENT DOCUMENTS

| | | | |
|---|---|---|---|
| 2015/0071123 A1 | 3/2015 | Sabaa | |
| 2015/0378702 A1 | 12/2015 | Govindaraju | |
| 2016/0062746 A1 | 3/2016 | Chiosi et al. | |
| 2016/0110183 A1 | 4/2016 | Fu et al. | |
| 2016/0269317 A1* | 9/2016 | Barzik | H04L 47/805 |
| 2017/0131899 A1* | 5/2017 | Billi | G06F 12/08 |
| 2017/0251058 A1* | 8/2017 | Zachariassen | G06F 3/0617 |
| 2018/0054454 A1 | 2/2018 | Astigarraga et al. | |
| 2018/0074724 A1* | 3/2018 | Tremblay | G06F 3/0611 |
| 2018/0143815 A1 | 5/2018 | Dain et al. | |
| 2018/0143895 A1 | 5/2018 | Dain et al. | |

OTHER PUBLICATIONS

Areret Anaby Tavor; "IBM Watson Tradeoff Analytics—General Availability"; IBM.com webstie [full URL in reference]; May 28, 2015.

U.S. Appl. No. 15/359,161 Office Action dated Feb. 8, 2018.

M. Chu et al., "Distributed In Vivo Testing of Software Applications", Department of Computer Science, Columbia University, New York NY 10027, 2008. 4 pages.

H. Dai et al., "Configuration Fuzzing for Software Vulnerablility Detection", 2010 International Conference on Availability, Reliability and Security, 2010, 6 pages.

M. Diep et al., "Profiling Deployed Software: Strategic Probe Placement", DigitalCommons©UniversityofNebraska—Lincoln, CSE Technical Reports, Jan. 1, 2005, 25 pages.

A. Duarte et al., "Multi-Environment Software Testing on the Grid", AMC Digital Library, Proceedings of the 2006 workshop on Parallel and distributed systems, 9 pages.

A. Orso, "Monitoring, Analysis, and Testing of Deployed Software", AMC Digital Library, Proceedings of the FSE/SDP workshop on Future of software engineering research, Nov. 2010, 5 pages.

M. Stehr, "Fractionated Software for Networked Cyber-Physical Systems: Research Directions and Long-Term Vision", SRI International, Nov. 2011, 34 pages.

R. Sayyad et al., "Failure Analysis and Reliability Study of NAND Flash-Based Solid State Drives." Indonesian Journal of Electrical Engineering and Computer Science 2.2 (2016): 315-327.

T. Savor et al., "Continuous deployment at Facebook and OANDA." Proceedings of the 38th International Conference on Software Engineering Companion. ACM, May 14-22, 2016, 10 pages.

Mark Peters et al., "Key Reasons to Use Software-defined Storage—and How to Get Started", White Paper, Feb. 2015, pp. 1-8.

U.S. Appl. No. 15/359,133, Final Office Action Summary, dated Dec. 20, 2018, pp. 1-15.

"List of Patents or Patent Applications Treated as Related" AppendixP, Aug. 29, 2018, p. 1.

U.S. Appl. No. 15/359,133, Office Action Summary, dated Jul. 5, 2018, pp. 1-20.

U.S. Appl. No. 15/359,161, Office Action Summary, dated Jun. 13, 2018, p. 1-12.

* cited by examiner

175

| SDS Solution Identifier 201 |
|---|
| SDS Component 205 |
| SDS Component 205 |
| SDS Element 207 |
| SDS Element 207 |

Filter Threshold
209

Log Analytics Function
219

| | Element Identifier 255 | Element Version 260 | Element Availability 265 |
|---|---|---|---|
| 215a | Element Identifier 255 | Element Version 260 | Element Availability 265 |
| 215b | Element Identifier 255 | Element Version 260 | Element Availability 265 |
| 215c | Element Identifier 255 | Element Version 260 | Element Availability 265 |
| 215d | Element Identifier 255 | Element Version 260 | Element Availability 265 |

FIG. 3A

VALIDATING A SOFTWARE DEFINED STORAGE SOLUTION BASED ON FIELD DATA

FIELD

The subject matter disclosed herein relates to software defined storage and more particularly relates to validating a software defined solution based on field data.

BACKGROUND

Software Defined Storage (SDS) solutions are often manually selected, deployed, and tuned.

BRIEF SUMMARY

An apparatus for validating an SDS solution based on SDS field data is disclosed. The apparatus includes a processor and a memory that stores code that is executable by the processor. The processor analyzes the SDS field data for a given SDS solution with a log analytics function. The SDS solution has not been validated with a test suite. The processor further validates the given SDS solution based on the SDS field data. A method and computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2F is a schematic block diagram illustrating one embodiment of computational elements;

FIG. 3A is a schematic block diagram illustrating one embodiment of an availability matrix;

DETAILED DESCRIPTION

Figure 1:
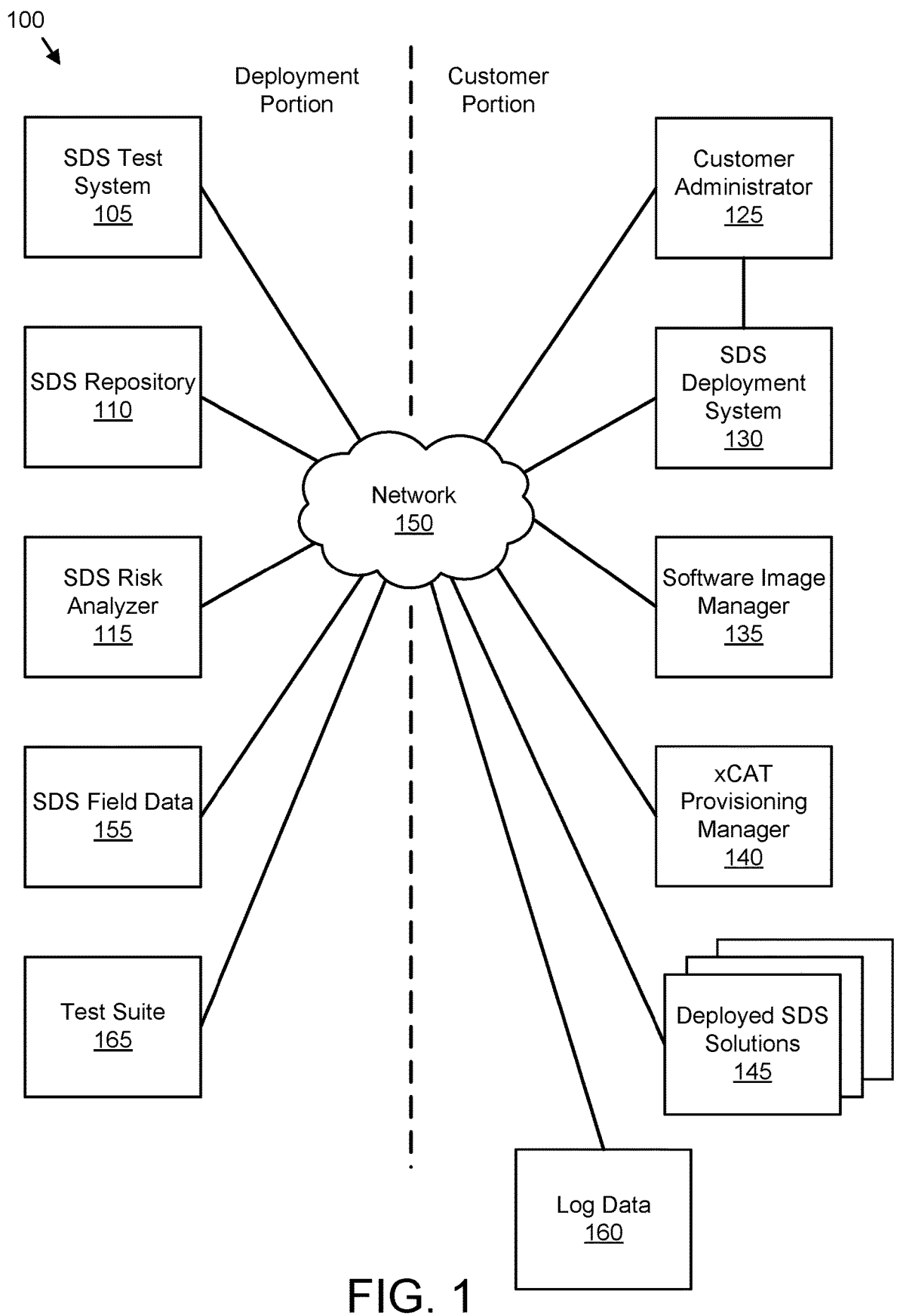
FIG. 1 is a schematic block diagram illustrating one embodiment of a Software Defined Storage (SDS) deployment system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 is a schematic block diagram illustrating one embodiment of a Software Defined Storage (SDS) deployment system 100. The system 100 may deploy SDS solutions to customers. In the depicted embodiment, the system 100 is organized into a deployment portion and the customer portion. The deployment portion may deploy an SDS solution to the customer portion. The system 100 includes an SDS test system 105, a repository 110, an SDS risk analyzer 115, SDS field data 155, a test suite 165, a customer administrator 125, an SDS deployment system 130, a software image manager 135, an xCAT provisioning manager 140, one or more deployed SDS solutions 145, log data 160, and a network 150.

An SDS solution may provide flexible, highly configurable data storage for the customer. Unfortunately, the flexibility and configurability of the SDS solution may result in the deployment of SDS solutions that are prone to operational problems and failures. The embodiments described herein validate SDS solutions based on the field data 155.

The system 100 may deploy SDS solutions from the deployment portion over the network 150 to the customer portion. The network 150 may comprise the Internet, a wide-area network, a local area network, a Wi-Fi network, a mobile telephone network, and combinations thereof. The software image manager 135 may receive an SDS solution. The SDS deployment system 130 may deploy the SDS solution as directed by the customer administrator 125. Hardware and software elements of the SDS solution may be provided by the xCAT provisioning manager 140. The one or more deployed SDS solutions 145 may provide data storage for the customer. Notifications, error messages, and the like relating to the operation of the deployed SDS solutions 145 may be stored in the log data 160.

The log data 160 and other information from the operation of the deployed SDS solutions 145 may be communicated to the SDS field data 155. The SDS field data 155 may be employed by the SDS risk analyzer 115 to evaluate the risk of deploying an SDS solution.

The SDS test system 105 may validate SDS solutions. In one embodiment, the SDS test system 105 employs the test suite 165 to validate SDS solutions. The test suite 165 may include a comprehensive set of validation tests. The validation tests may test most functions of an SDS solution. Validated SDS solutions may be stored in the SDS repository 110.

Unfortunately, not all desired SDS solutions have been validated by the SDS test system 105. For example, the customer administrator 125 may request an SDS solution for immediate deployment that is not stored in the SDS repository 110. The SDS risk analyzer 115 may evaluate the risks of deploying an SDS solution. In one embodiment, the SDS risk analyzer 115 evaluates the risks of deploying an SDS solution that has not been validated by the SDS test system 105 using the SDS field data 155. Based on the evaluation of the risks, and SDS solution may be validated and deployed.

Figure 2A:
FIG. 2A is a schematic block diagram illustrating one embodiment of an SDS solution.

FIG. 2A is a schematic block diagram illustrating one embodiment of an SDS solution 200. The SDS solution 200 maybe organized as a data structure in a memory. In the depicted embodiment, the SDS solution 200 includes an SDS solution identifier 201 and a plurality of SDS components 205. The SDS solution identifier 201 may uniquely identify an SDS solution 200. The SDS solution identifier 201 may be an index, an alphanumeric string, a key in a key-value store, or any other similar type of indexing method. An SDS component 205 may be an operating system, a hardware device, a driver, a software application, or combinations thereof. The SDS component 205 is described in more detail in FIG. 5B.

Figure 2B:
FIG. 2B is a schematic block diagram illustrating one embodiment of an SDS component.

FIG. 2B is a schematic block diagram illustrating one embodiment of the SDS component 205. The SDS component 205 may be organized as a data structure in a memory. In the depicted embodiment, the SDS component 205 includes a component identifier 210, a hardware identifier 215, software prerequisites 220, an operating system identifier 225, an operating system version 230, a driver identifier 233, and a driver version 235.

The component identifier 210 may uniquely identify the SDS component 205. The component identifier 210 may be an index, an alphanumeric string, a key in a key-value store, or any other similar type of indexing method. The hardware identifier 215 may identify one or more hardware devices. The hardware devices may be integral to the SDS component 205. Alternatively, the hardware devices may be prerequisites required by the SDS component 205.

The software prerequisites 220 may identify one or more software instances that are required by the SDS component 205. In one embodiment, the software prerequisites 220 identify one or more combinations of software instances that could each be employed by the SDS component 205.

The operating system identifier 225 identifies an operating system that is required by the SDS component 205. The operating system version 230 identifies one or more required versions of the operating system.

The driver identifier 233 identifies a software and/or firmware driver for the SDS component 205. The driver version 235 identifies one or more required versions of the driver.

The hardware devices, software instances, operating systems, and device drivers of the SDS component 205 may be referred to generically as elements. Thus, the SDS component 205 comprises a plurality of elements. One or more of the hardware identifier 215, software prerequisites 220, operating system identifier 225, operating system version 230, driver identifier 233, and driver version identifier 235 may have a NULL value that indicates that the element is not used and/or not required.

Figure 2C:
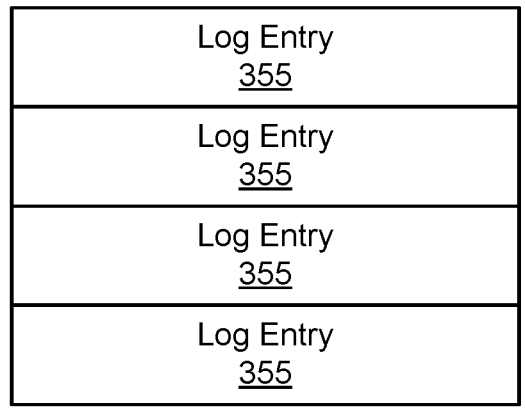
FIG. 2C is a schematic block diagram illustrating one embodiment of log data.

FIG. 2C is a schematic block diagram illustrating one embodiment of the log data 160. The log data 160 may be organized as a data structure in a memory. In the depicted embodiment, the log data 160 includes one or more log entries 355. Each log entry 355 may comprise one or more of a status report, a notification, and an error message. The log entries 355 may be recorded for deployed SDS solutions 145. In one embodiment, each log entry 355 includes an SDS solution identifier 201. Alternatively, the log data 160 may include the SDS solution identifier 201. In a certain embodiment, the log data 160 includes information from which the SDS solution identifier 201 may be calculated.

Figure 2D:
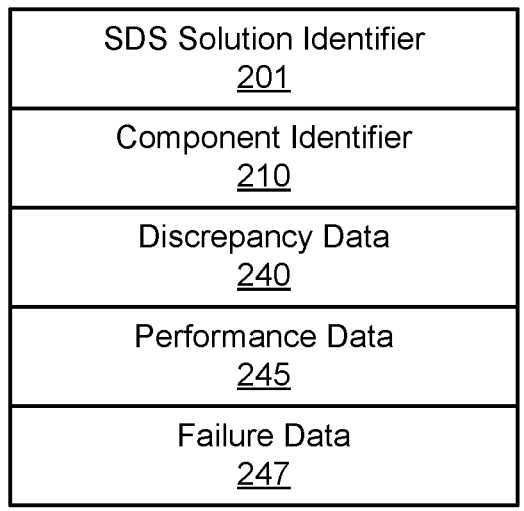
FIG. 2D is a schematic block diagram illustrating one embodiment of SDS field data.

FIG. 2D is a schematic block diagram illustrating one embodiment of the SDS field data 155. The SDS field data 155 may be organized as a data structure in a memory. In the depicted embodiment, an SDS field data instance 155 is shown that includes the SDS solution identifier 201, the component identifier 210, discrepancy data 240, performance data 245, and failure data 247. The SDS field data 155 may include a plurality of SDS field data instances 155.

The discrepancy data 240 may record discrepancies, errors, problem reports, failures, and the like associated with the SDS solution 200 identified by the SDS solution identifier 201 and/or the SDS component 205 identified by the component identifier 210. In one embodiment, the discrepancy data 240 is calculated as a function of the failure data 247 such as hard failures and soft failures in the failure data 247 and a hard failure threshold and the soft failure threshold. In a certain embodiment, hard failures are failures that exceed the hard failure threshold. In addition, soft failures may be failures that exceed the soft failure threshold but do not exceed the hard failure threshold.

The performance data 245 may record one or more performance metrics associated with the SDS solution 200 identified by the SDS solution identifier 201 and/or the SDS component 205 identified by the component identifier 210. The failure data 247 is described in more detail in FIG. 3B.

Figure 2E:
FIG. 2E is a schematic block diagram illustrating one embodiment of SDS parameters.

FIG. 2E is a schematic block diagram illustrating one embodiment of SDS parameters 175. The SDS parameters 175 may be organized as a data structure in a memory. In the depicted embodiment, the SDS parameters 175 included an SDS solution identifier 201, SDS components 205, and SDS elements 207. However, the SDS parameters 175 may include no SDS components 205 or no SDS elements 207. The SDS solution identifier 201 may identify a model and/or desired SDS solution 200. Each SDS element 207 may identify a portion of an SDS component 205. For example, an SDS element 207 may identify a hard disk drive model with a hardware identifier 215 without identifying software prerequisites 220, an operating system identifier 225, or a driver identifier 230. The SDS parameters 175 may be specified by the customer administrator 125, the SDS risk analyzer 115, and/or a computer to provide a preliminary description of the model SDS solution 200 and/or the desired SDS solution 200.

FIG. 2F is a schematic block diagram illustrating one embodiment of computational elements. The computational elements may comprise code that performs one or more algorithms. In the depicted embodiment, the computational elements include a filter threshold 209 and a log analytics function 219. The filter threshold 209 may be created for the SDS parameters 175 and used to identify a validated SDS solution 200.

In one embodiment, the log analytics function 219 analyzes the SDS field data 155 for keywords. In a certain embodiment, the log analytics function 219 analyzes the log entries 355 and/or log data 160. The SDS field data 155 may be classified based on the keywords. In addition, the log analytics function 219 may validate an SDS solution 200 based on the classifications derived from the SDS field data 155.

The log analytics function 219 may be trained using training data comprising SDS components 205, discrepancy data 240, and performance data 245. In a certain embodiment, the training data further comprises the failure data 247. In one embodiment, the log analytics function 219 is a log analytics function Application Program Interface (API) such as the WATSON® log analytics API.

FIG. 3A is a schematic block diagram illustrating one embodiment of an availability matrix 250. The availability matrix 250 may record the availability of SDS elements 207 of SDS components 205. The SDS repository 110 may store the availability matrix 250. The availability matrix 250 may be organized as a data structure in a memory. In the depicted embodiment, the availability matrix 250 includes a plurality of availability matrix entries 215. Each availability matrix entry 215 includes an element identifier 255, an element version 260, and an element availability 265. The availability matrix 250 may store an entry 215 for each SDS element 207 of each SDS component 205.

The element identifier 255 may identify an SDS element 207 that is used in one or more SDS components 205. The element identifier 255 may be a software identifier, hardware model number, or combinations thereof. The element version 260 may specify a unique version of the SDS element 207. The element availability 265 may specify whether or not the SDS element 207 is available. For example, if a hard disk drive identified by the element identifier 255 with a model number specified by the element identifier 255 cannot be procured and/or cannot be deployed, the element availability 265 may be set to "unavailable." However, if the hard disk drive can be procured and/or can be deployed, the element availability 265 may be set to "available."

Figure 3B:
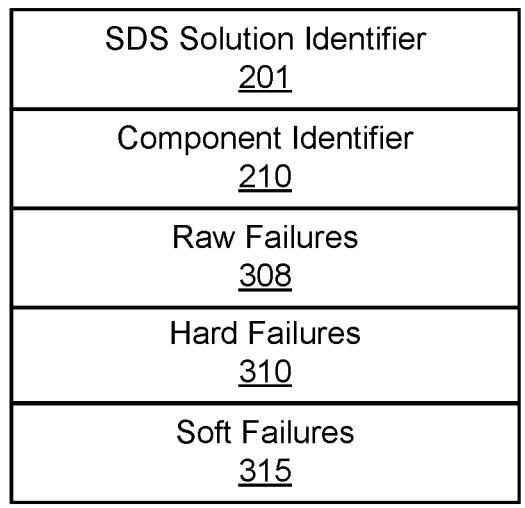
FIG. 3B is a schematic block diagram illustrating one embodiment of failure data.

FIG. 3B is a schematic block diagram illustrating one embodiment of the failure data 247. The failure data 247 may be organized as a data structure in a memory. In one embodiment, the failure data 247 is stored with the SDS field data 155. In the depicted embodiment, the failure data 247 includes the SDS solution identifier 201, the component identifier 210, raw failures 308, hard failures 310, and soft failures 315.

The raw failures 308 may comprise uncategorized failures from the log data 160. In one embodiment, the hard failures 310 record a number of raw failures 308 that exceed the hard failure threshold for the SDS solution 200 identified by the SDS solution identifier 201 and/or the SDS component 205 identified by the component identifier 210. The soft failures 315 may record a number of raw failures 308 that exceed the soft failure threshold for the SDS solution 200 identified by the SDS solution identifier 201 and/or the SDS component 205 identified by the component identifier 210.

Figure 3C:
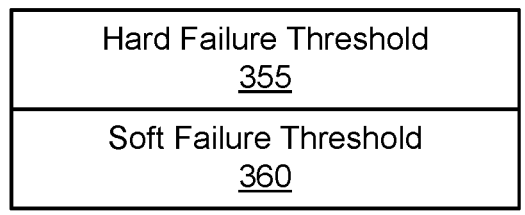
FIG. 3C is a schematic block diagram illustrating one embodiment of threshold data.

FIG. 3C is a schematic block diagram illustrating one embodiment of threshold data 350. The threshold data 350 may be organized as a data structure in a memory. In one embodiment, the threshold data 350 is stored with the SDS field data 155. In the depicted embodiment, the threshold data 350 includes the hard failure threshold 355 and the soft failure threshold 360.

The hard failure threshold 355 may specify one or more of a type of failure and/or a quantity of failures. When the hard failure threshold 355 is exceeded, a hard failure 310 may be identified. The soft failure threshold 360 may specify one or more of a type of failure and a quantity of failures. When the soft failure threshold 360 is exceeded, a soft failure 315 may be identified. In one embodiment, if both the hard failure threshold 355 and the soft failure threshold 360 are exceeded, a hard failure 310 is identified.

Figure 4A:
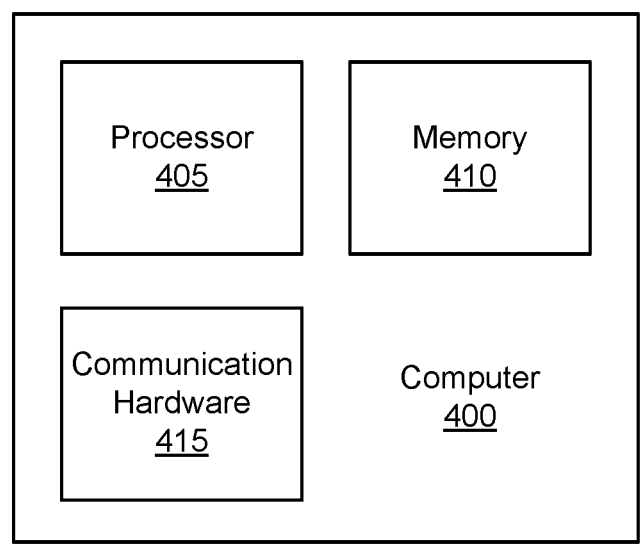
FIG. 4A is a schematic block diagram illustrating one embodiment of a computer.

FIG. 4A is a schematic block diagram illustrating one embodiment of a computer 400. The computer 400 may be embodied in one or more of the SDS test system 105, the SDS repository 110, the SDS risk analyzer 115, the customer administrator 125, the SDS deployment system 130, the software image manager 135, and the xCAT provisioning manager 140. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices.

Figure 4B:
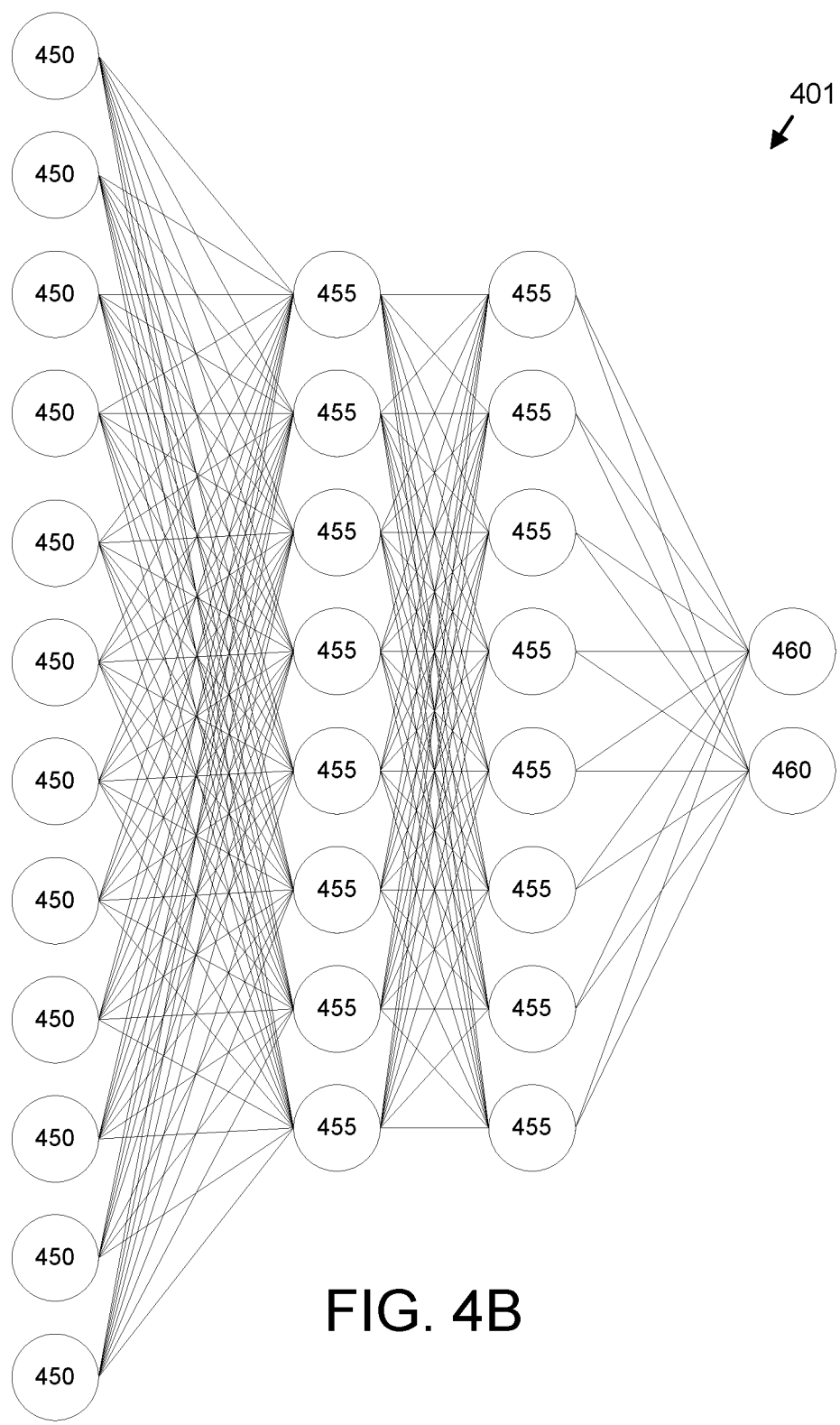
FIG. 4B is a schematic block diagram illustrating one embodiment of a neural network.

FIG. 4B is a schematic block diagram illustrating one embodiment of a neural network 401. The neural network 401 includes a plurality of input nodes 450, a plurality of hidden nodes 455, and a plurality of output nodes 460. In addition, the neural network 401 may embody a portion of the log analytics function 219. The output nodes 460 may represent one or more results and/or conclusions. In one embodiment, the output nodes 460 indicate whether a given SDS solution 200 is valid or invalid. The input data may be encoded and presented to the input nodes 450. In one embodiment, the input data may be SDS field data 155. The hidden nodes 455 and the output nodes 460 may be trained using training data. The training data may comprise the SDS field data 155 and corresponding component identifiers 210 and element identifiers 255. After the neural network 401 is trained, the encoded SDS field data 155 may be presented to the input nodes 450 to generate a validation of SDS solutions 200 at the output nodes 460. In an alternate embodiment, one or more of a decision tree, a sum of weighted products, and the like may be used to generate the validation of the SDS solutions 200.

Figure 5A:
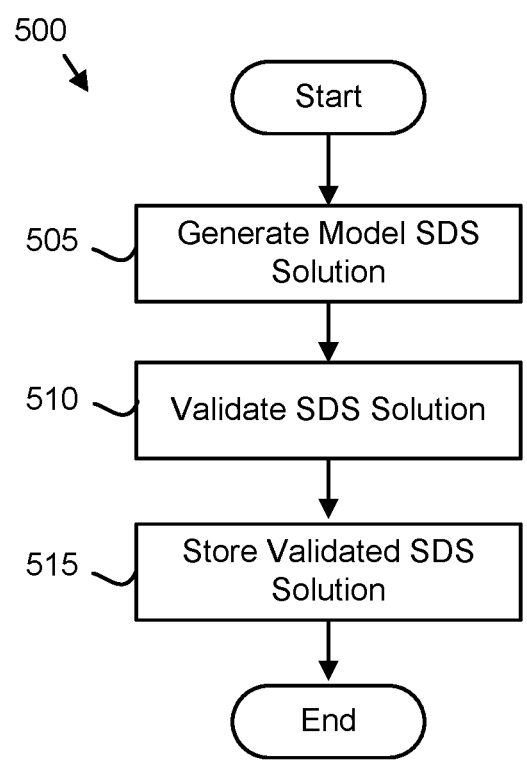
FIG. 5A is a schematic flow chart diagram illustrating one embodiment of a validation method.

FIG. 5A is a schematic flow chart diagram illustrating one embodiment of a validation method 500. The method 500 may validate and store an SDS solution 200. The method 500 may be performed by the computer 400 and/or by the processor 405 of the computer 400. In addition, the method 500 may be performed by a computer readable storage medium such as the memory 410 storing code that is executable by the processor 405.

The method 500 starts, and in one embodiment, the processor 405 generates 505 a model SDS solution 200. In one embodiment, the model SDS solution 200 is generated 505 based on one or more desired SDS parameters 175 for a desired SDS solution 200 supplied by the customer administrator 125. In addition, the SDS risk analyzer 115 analyze the one or more desired SDS parameters 175 to generate 505 the model SDS solution 200. In one embodiment, the SDS risk analyzer 115 employs the neural network 401 to analyze the one or more desired SDS parameters 175 and generate the model SDS Solution 200.

The processor 405 may validate 510 the model SDS solution 200 using the test suite 165. In one embodiment, the SDS test system 105 autonomously performs the test suite 165 on the model SDS solution 200. If the model SDS solution 200 fails the test suite 165, the model SDS solution 200 may be iteratively modified until the model SDS solution 200 passes the test suite 165.

In one embodiment, the processor 405 may validate 510 the model SDS solution 200 using the availability matrix 250. The processor 405 may determine that each element of each SDS component 205 of the model SDS solution 200 is available for deployment. In a certain embodiment, the model SDS solution 200 must be both validated by the test suite 165 and the availability matrix 250 to be considered fully validated.

In response to validating the model SDS solution 200, the processor 405 may store the validated SDS solution 200 in the SDS repository 110 and the method 500 ends.

Figure 5B:
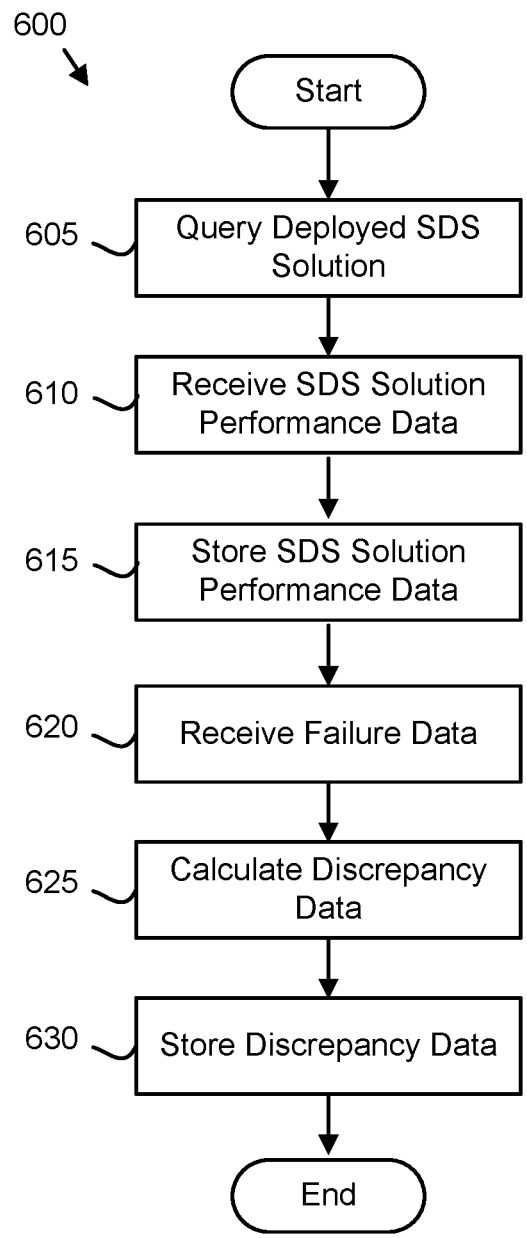
FIG. 5B is a schematic flow chart diagram illustrating one embodiment of discrepancy data method.

FIG. 5B is a schematic flow chart diagram illustrating one embodiment of discrepancy data method 600. The method 600 may store performance data 245 from a deployed SDS solution 145 and calculate and store discrepancy data 240 from the deployed SDS solution 145. The method 600 may be performed by the computer 400 and/or by the processor 405 of the computer 400. In addition, the method 600 may be performed by a computer readable storage medium such as the memory 410 storing code that is executable by the processor 405.

The method 600 starts, and in one embodiment, the processor 405 queries 605 a deployed SDS solution 145 for performance data 245. The processor 405 may query 605 the deployed SDS solution 145 through the network 150. In one embodiment, a query request includes one or more authorization credentials. In a certain embodiment, the processor 405 also queries 605 the deployed SDS solution 145 for failure data 247. The failure data 247 may be embodied in the log data 160.

The processor 405 further receives 610 the performance data 245 from the deployed SDS solution 145. In a certain embodiment, the performance data 245 is included in the log data 160. The processor 405 may store 615 the performance data 245. In one embodiment, the performance data 245 is stored 615 in the SDS field data 155.

The processor 405 may receive 620 the failure data 247. The failure data 247 may be included in the log data 160. The processor 405 may further calculate 625 the discrepancy data 240 from the failure data 247. In one embodiment, the processor 405 generates a training data set from the log data 160 that includes outputs of an SDS solution identifier 201 and a component identifier 210 for previous failure data 247, hard failures 310 for the previous failure data 247, and soft failures 315 for the previous failure data 247. The processor 405 may further train the neural network 401 using the training data set. The processor 405 may calculate 625 the discrepancy data 240 from the failure data 247 of the log data 160 by encoding the log data 160 and introducing the encoded log data 160 to the neural network 401.

In an alternative embodiment, the processor 405 may identify a discrete error message within the failure data 247. The processor 405 may further identify the SDS solution identifier 201 and the component identifier 210 from the error message. In one embodiment, the processor 405 calculate 625 whether a failure of the error message exceeds the hard failure threshold 355. If the failure exceeds the hard failure threshold 355, the processor 405 may identify a hard failure 310. In one embodiment, the calculation 625 stops after identifying one hard failure 310. The processor 405 may further calculate 625 whether the failure of the error message exceeds the soft failure threshold 360. If the failure exceeds the soft failure threshold 360 and does not exceed the hard failure threshold 355, the processor 405 may identify a soft failure 315.

In one embodiment, the processor 405 employs a heuristic algorithm that analyzes the discrete error message and two to five preceding error messages to calculate 625 the hard failures 310 and the soft failures 315. The processor 405 may store 630 the discrepancy data 240 to the SDS field data 155 and the method 600 ends.

Figure 5C:
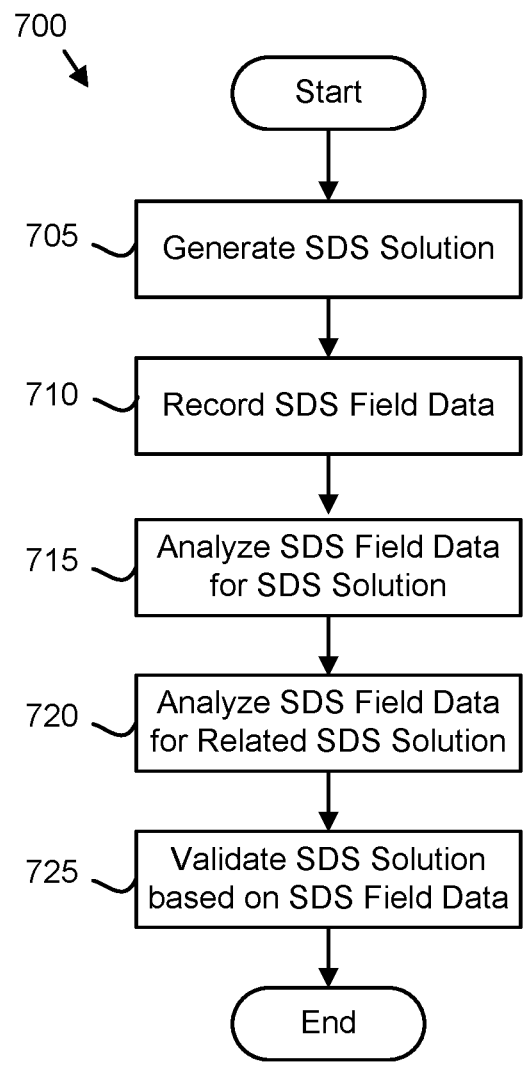
FIG. 5C is a schematic flow chart diagram illustrating one embodiment of an SDS solution validation method.

FIG. 5C is a schematic flow chart diagram illustrating one embodiment of an SDS solution validation method 700. The method 700 may validate an SDS solution based on SDS field data 155. The method 700 may be performed by SDS risk analyzer 115 embodied in the computer 400 and/or by the processor 405 of the computer 400. In addition, the method 700 may be performed by a computer readable storage medium such as the memory 410 storing code that is executable by the processor 405.

The method 700 starts, and in one embodiment, the processor 405 generates 705 a given SDS solution 200. The given SDS solution 200 may be generated 705 from the SDS parameters 175. The SDS parameters 175 may be provided by a customer administrator 125. Alternatively, the SDS parameters 175 may be automatically generated in response to our requirements list.

In one embodiment, the given SDS solution 200 has not been validated. For example, the SDS test system 105 may not have been used to validate the given SDS solution 200 using the test suite 165. As a result, the given SDS solution 200 may perform unacceptably when deployed as a deployed SDS solution 145. The method 700 validates the given SDS solution 200 without performing the validation method 500 described in FIG. 5A.

The processor 405 may record 710 SDS field data 155. In one embodiment, the SDS field data 155 comprises call home data from one or more deployed SDS solutions 145. The SDS field data 155 may include the log data 160. In addition, the SDS field data 155 may be parsed from one or more log entries 355.

In one embodiment, the SDS field data 155 comprises manually-opened problem records. The manually opened problem records may be Quantitative Structure-Activity Relationship/Responsible Care Management System (QSAR/RCMS) records. The SDS field data 155 may be parsed from the manually-opened problem records.

The processor 405 may analyze 715 the SDS field data 155 for the given SDS solution 200 with the log analytics function 219. The log analytics function 219 may parse keywords from the SDS field data 155. In addition, the log analytics function 219 may classify problems associated with the SDS components 205 and/or SDS elements 207 of the SDS solution 200 based on the keywords.

The processor 405 may further analyze 720 the SDS field data 155 for a related SDS solution 200. In one embodiment, a first SDS solution 200 is a related SDS solution 200 if a weighted sum of differences between the given SDS solution 200 and the first SDS solution 200 is less than a relation threshold. The processor 405 may identify all related SDS solutions 200 and analyze 720 the SDS field data 155 for each related SDS solution 200.

The processor 405 may validate 725 the given SDS solution 200 based on the analysis of the SDS field data 155 and the method 700 ends. In one embodiment, the validation 725 is only based on the SDS field data 155 for the given SDS solution 200. Alternatively, the validation 725 is based on the aggregated SDS field data 155 for the given SDS solution 200 and each related SDS solution 200. The processor 405 may validate 725 the given SDS solution 200 if the problems classified from the SDS field data 155 are less than a validation threshold.

The embodiments analyze the SDS field data for the given SDS solution 200 with the log analytics function 219. In addition, the embodiments validate the given SDS solution 200 based on the SDS field data 155. As a result, the given SDS solution 200 may be validated without formal testing using the SDS test system 105. The embodiments allow a desired given SDS solution 200 to be rapidly validated and deployed. Therefore, a request from a customer administrator 125 or another source may be more rapidly analyzed, validated, and acted upon.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory storing code executable by the processor to perform:
   parsing keywords from field data for a given software defined storage (SDS) solution, wherein the given SDS solution comprises a data structure comprising SDS components comprising a hardware identifier that identifies hardware, software prerequisites that identify software instances, an operating system identifier that identifies an operating system, and a driver identifier that identifies drivers, wherein the hardware, software instances, operating system, and drivers are deployed at a computer system to provide configurable data storage, wherein the given SDS solution has not been validated with a test suite, and wherein the field data comprises a plurality of component identifiers for deployed SDS solutions, discrepancy data, performance data, and failure data from the deployed SDS solutions for the SDS components of the given SDS solution;

identifying a related SDS solution, wherein the related SDS solution has a weighted sum of differences of the keywords with the given SDS solution of less than a relation threshold;

validating the given SDS solution based on the field data for the given SDS solution and the related SDS solution; and deploying the SDS solution via a network to a first computer system that provides the hardware, the software instances, the operating system, and the drivers identified by the SDS solution.

2. The apparatus of claim 1, the processor further performing parsing keywords from the field data for the related SDS solution.

3. The apparatus of claim 1, the processor further performing analyzing the field data with a log analytics function, wherein the log analytics function is trained using training data comprising the components, the discrepancy data, and the performance data.

4. The apparatus of claim 3, wherein the log analytics function is a log analytics Application Program Interface.

5. The apparatus of claim 1, wherein the field data further comprises manually-opened problem records.

6. The apparatus of claim 1, wherein the processor further performs:
generating a model SDS solution;
validating the model SDS solution using a test suite; and
in response to validating the model SDS solution, storing the validated SDS solution in a repository.

7. The apparatus of claim 1, wherein the processor further performs:
querying the deployed SDS solutions for performance data;
receiving the performance data from the deployed SDS solutions;
storing the performance data;
receiving failure data;
calculating the discrepancy data for the deployed SDS solutions from the failure data; and
storing the discrepancy data.

8. A method comprising:
parsing keywords, by use of a processor, from field data for a given software defined storage (SDS) solution, wherein the given SDS solution comprises a data structure comprising SDS components comprising a hardware identifier that identifies hardware, software prerequisites that identify software instances, an operating system identifier that identifies an operating system, and a driver identifier that identifies drivers, wherein the hardware, software instances, operating system, and drivers are deployed at a computer system to provide configurable data storage, wherein the given SDS solution has not been validated with a test suite, and wherein the field data comprises a plurality of component identifiers for deployed SDS solutions, discrepancy data, performance data, and failure data from the deployed SDS solutions for the SDS components of the given SDS solution;

identifying a related SDS solution, wherein the related SDS solution has a weighted sum of differences of the keywords with the given SDS solution of less than a relation threshold;

validating the given SDS solution based on the field data for the given SDS solution and the related SDS solution; and deploying the SDS solution via a network to a first computer system that provides the hardware, the software instances, the operating system, and the drivers identified by the SDS solution.

9. The method of claim 8, the method further comprising parsing keywords from the field data for the related SDS solution.

10. The method of claim 8, the method further analyzing the field data with a log analytics function, wherein the log analytics function is trained using training data comprising the components, the discrepancy data, and the performance data.

11. The method of claim 10, wherein the log analytics function is a log analytics Application Program Interface.

12. The method of claim 8, wherein the field data further comprises manually-opened problem records.

13. The method of claim 8, wherein the method further comprises:
generating a model SDS solution;
validating the model SDS solution using a test suite; and
in response to validating the model SDS solution, storing the validated SDS solution in a repository.

14. The method of claim 8, wherein the method further comprises:
querying the deployed SDS solutions for performance data;
receiving the performance data from the deployed SDS solutions;
storing the performance data;
receiving failure data;
calculating the discrepancy data for the deployed SDS solution from the failure data; and
storing the discrepancy data.

15. A computer program product for validating a configurable storage solution, the computer program product comprising a non-transitory computer readable storage medium having program instructions embodied therewith, the program instructions readable/executable by a processor to cause the processor to:
parse keywords from field data for a given software defined storage (SDS) solution, wherein the given SDS solution comprises a data structure comprising SDS components comprising a hardware identifier that identifies hardware, software prerequisites that identify software instances, an operating system identifier that identifies an operating system, and a driver identifier that identifies drivers, wherein the hardware, software instances, operating system, and drivers are deployed at a computer system to provide configurable data storage, wherein the given SDS solution has not been validated with a test suite, and wherein the field data comprises a plurality of component identifiers for a deployed SDS solutions, discrepancy data, performance data, and failure data from the deployed SDS solutions for the SDS components of the given SDS solution;

identify a related SDS solution, wherein the related SDS solution has a weighted sum of differences of the keywords with the given SDS solution of less than a relation threshold;

validate the given SDS solution based on the field data for the given SDS solution and the related SDS solution; and deploy the SDS solution via a network to a first computer system that provides the hardware, the software instances, the operating system, and the drivers identified by the SDS solution.

16. The computer program product of claim 15, the processor further parses keywords from the field data for the related SDS solution.

17. The computer program product of claim 15, the processor further analyzes the field data with a log analytics function, wherein the log analytics function is trained using training data comprising the components, the discrepancy data, and the performance data.

18. The computer program product of claim 17, wherein the log analytics function is a log analytics Application Program Interface.

19. The computer program product of claim 15, wherein the field data further comprises manually-opened problem records.

20. The computer program product of claim 15, wherein the processor further:
generates a model SDS solution;
validates the model SDS solution using a test suite; and
in response to validating the SDS storage solution, stores the validated SDS solution in a repository.

* * * * *